(12) United States Patent
Kern et al.

(10) Patent No.: US 6,552,454 B2
(45) Date of Patent: Apr. 22, 2003

(54) GENERATOR STRUCTURE INCORPORATING MULTIPLE ELECTRICAL GENERATOR SETS

(75) Inventors: Robert D. Kern, Waukesha, WI (US);
Peter Winnie, Jefferson, WI (US);
Gerald C. Ruehlow, Oconomowoc, WI (US); Bret Baird, Eagle, WI (US);
Allen Gillette, Muskego, WI (US);
Patrick Forsythe, Waukesha, WI (US);
Rodney Nicosen, Eagle, WI (US)

(73) Assignee: Generac Power Systems, Inc., Waukesha, WI (US)

(*) Notice: Subject to any disclaimer, the term of this patent is extended or adjusted under 35 U.S.C. 154(b) by 0 days.

(21) Appl. No.: 09/904,421

(22) Filed: Jul. 12, 2001

(65) Prior Publication Data

US 2003/0011258 A1 Jan. 16, 2003

(51) Int. Cl.[7] .............................. H02K 5/00; H02K 7/20
(52) U.S. Cl. ........................ 310/89; 310/112; 310/58; 290/1 B; 123/2
(58) Field of Search ........................... 307/84; 310/112, 310/114, 89, 122, 127, 136, 140, 141, 52, 58, 60 R; 290/1 B, 4 R; 123/2; 60/720

(56) References Cited

U.S. PATENT DOCUMENTS

| | | | | |
|---|---|---|---|---|
| 2,006,523 A | * | 7/1935 | Strong | 290/30 B |
| 2,476,893 A | * | 7/1949 | Mueller et al. | 310/112 |
| 2,892,098 A | * | 6/1959 | Bergvall | 307/57 |
| 4,721,070 A | * | 1/1988 | Tanaka et al. | 123/198 E |
| 5,899,174 A | * | 5/1999 | Anderson et al. | 123/2 |
| 5,977,667 A | * | 11/1999 | Hirose | 290/1 B |

* cited by examiner

Primary Examiner—Burton S. Mullins
(74) Attorney, Agent, or Firm—Boyle Fredrickson Newholm Stein & Gratz S.C.

(57) ABSTRACT

A generator structure is provided for generating electrical power. The generator structure includes an enclosure having first and second spaced sidewalls interconnected by first and second end walls so as to define an interior. First and second generator sets are positioned within the interior of the enclosure. Each generator set includes an engine, an alternator driven by the engine for generating the electrical power and a radiator operatively connected to the engine. Means are provided for synchronizing the electrical power generated by each alternator.

20 Claims, 5 Drawing Sheets

GENERATOR STRUCTURE INCORPORATING MULTIPLE ELECTRICAL GENERATOR SETS

FIELD OF THE INVENTION

This invention relates generally to engine-driven, electrical generators, and in particular, to a generator structure which incorporates multiple engine-driven, electrical generator sets within a single enclosure.

BACKGROUND AND SUMMARY OF THE INVENTION

Engine-driven, electrical generators are used in a wide variety of applications. Typically, electrical generators utilize a single driving engine directly coupled to a generator or alternator through a common shaft. Upon actuation of the engine, the crankshaft thereof rotates the common shaft so as to drive the alternator which, in turn, generates electrical power. It can be appreciated that the power generated by the electrical generator is directly related to the sizes of the engine and the alternator. Heretofore, users that required a larger, higher power electrical generator paid a premium for such a unit. This is due to the fact that smaller engines are produced in higher volumes, and as such, the cost of production is reduced by economies of scale. As such, users that require higher power electrical generators must either pay the premium or buy multiple, lower power electrical generators to meet their demands. However, the use of multiple, lower power electrical generators to meet the higher power demands of a user may have significant drawbacks.

As is known, in order to provide electrical power to a load utilizing multiple, lower power electrical generators, the multiple electrical generators must be connected in parallel. As such, the AC power generated by each of the electrical generators must be synchronized. In order to synchronize the AC power outputs of the electrical generators connected in parallel, a user must purchase additional equipment such as a synchronizer. This, in turn, increases the overall cost of the electrical power generation system purchased by the user.

Further, it can be appreciated that each electrical generator has a footprint of a predetermined size. Consequently, the use of multiple electrical generators connected in parallel may require a significant amount of additional space. In environments where space is at a premium, the paralleling of multiple electrical generators may not be economically or spacially feasible. As such, it is highly desirable to provide a generator structure which provides higher power outputs and which is less expensive than prior units and which is capable of generating equivalent AC power as such prior units. In addition, it is highly desirable to provide a generator structure as a single unit which is capable of generating the equivalent AC power as multiple, prior generator sets connected in parallel.

Therefore, it is a primary object and feature of the present invention to provide a generator structure that is less expensive to manufacture than prior electrical generator structures.

It is a further object and feature of the present invention to provide a generator structure which generates the equivalent AC power and has a smaller footprint than parallel connected, prior generator structures.

It is a still further object and feature of the present invention to provide a generator structure which incorporates multiple, engine-driven electrical generator sets within a single enclosure.

In accordance with the present invention, a generator structure is provided. The generator structure includes an enclosure having first and second space sidewalls interconnected by first and second end walls so as to define an interior of the enclosure. A first generator set is positioned within the enclosure. The first generator set includes an engine and an alternator driven by the engine. A second generator set is also positioned in the enclosure. The second generator set includes an engine and an alternator driven by the engine of the second generator set.

It is contemplated that the first generator set be positioned adjacent the first sidewall of the enclosure and the second generator set be positioned adjacent the second sidewall of the enclosure. Each generator set includes a fan end and an alternator end. The fan end of the first generator set is positioned adjacent the first end wall of the enclosure and the alternator end of the second generator set is positioned adjacent the first end wall of the enclosure. The fan end of the second generator set is positioned adjacent the second end wall of the enclosure and the alternator end of the first generator set is positioned adjacent the second end wall of the enclosure.

Each generator set includes a drive shaft operatively connecting the engine and the alternator to drive the alternator. Each drive shaft extends along and is rotatable about a corresponding axis. It is contemplated that the drive shaft of the first generator set rotates in a first direction and the drive shaft of the second generator set rotates in a second, opposite direction.

The first generator set generates electrical power of a first magnitude and frequency and the second generator set generates electrical power at a second magnitude and frequency. A means is provided for synchronizing the electrical power generated by the first generator set and the electrical power generated by the second generator set.

In accordance with a further aspect of the present invention, an improvement in a generator structure for generating electrical power is provided. The generator structure includes an enclosure having first and second spaced sidewalls interconnected by first and second end walls so as to define an interior of the enclosure. The improvement includes a first generator set positioned within the enclosure. The first generator set includes an engine and an alternator driven by the engine. A second generator set is also positioned within the enclosure. The second generator set includes an engine and an alternator driven by the engine of the second generator set.

The first generator is positioned adjacent the first sidewall of the enclosure and the second generator set is positioned adjacent the second sidewall of the enclosure. Each generator set includes a fan end and an alternator end. The fan end of the first generator set is positioned adjacent the first end wall of the enclosure and the alternator end of the second generator is positioned adjacent the first end wall of the enclosure. A fan end of the second generator set is positioned adjacent the second end wall of the enclosure and the alternator end of the first generator set is positioned adjacent the second end wall of the enclosure.

Each generator set also includes a drive shaft operatively connecting to the engine and the alternator to drive the alternator. Each drive shaft extends along and is rotatable about a corresponding axis. The drive shaft of the first generator set rotates in a first direction and the drive shaft of the second generator ser rotates in a second, opposite direction.

The first generator set generates electrical power at a first magnitude and frequency and the second generator set generates electrical power at a second magnitude and frequency. The improvement includes a means for synchronizing the electrical power generated by the first generator set and the electrical power generated by the second generator set.

In accordance with a still further aspect of the present invention, a generator structure is provided. The generator structure includes an enclosure having first and second spaced sidewalls interconnected by first and second end walls so as to define an interior. First and second generator sets are positioned within the interior of the enclosure. Each generator set includes an engine, an alternator driven by the engine for generating electrical power and a radiator operatively connected to the engine. Means are provided for synchronizing the electrical power generated by each alternator.

A generator structure has a roof structure supported on the end walls of the enclosure. The roof structure includes an upper panel, first and second side panels and a separation panel. The upper panel has first and second openings therethrough and first and second sides which are generally parallel to the sidewalls of the enclosure. The first and second side panels extend from corresponding sides of the upper panel such that each side panel partially overlaps corresponding sidewalls of the enclosure. The first side panel and the first sidewall define a first inlet therebetween and the second side panel and the second sidewall define a second inlet therebetween. The separation panel extends between the side panels such that the separation panel and the upper panel define an attic chamber therebetween. The separation panel and the first end wall define a first attic inlet to allow the interior of the enclosure to communicate with the attic chamber. The separation panel and the second end wall define a second attic inlet for allowing communication between the interior of the enclosure and the attic chamber. A first air flow generator is positioned within the interior of the enclosure for drawing ambient air through the first and second inlets in the roof structure, across the engine of the first generator set and through the radiator of the first generator set. In addition, the first air flow generator urges air from the interior of the enclosure through the attic chamber in the roof structure and out of the generator structure through the first opening in the upper panel. A second air flow generator is positioned within the interior of the enclosure for drawing ambient air through the first and second inlets in the roof structure, across the engine of the second generator set and through the radiator of the second generator set. In addition, the second air flow generator urges air from the interior of the enclosure through the attic chamber in the roof structure and out of the generator structure through the second opening in the upper panel.

The first generator set is positioned adjacent the first sidewall of the enclosure and the second generator set is positioned adjacent the second sidewall of the enclosure. Each generator set includes a fan end and an alternator end. The fan end of the first generator set is positioned adjacent the first end wall of the enclosure and the alternator end of the second generator set is positioned adjacent the first end wall of the enclosure. The fan end of the second generator set is positioned adjacent the second end wall of the enclosure and the alternator end of the first generator set is positioned adjacent the second end wall of the enclosure. Each generator set also includes a drive shaft connecting from the engine to the alternator thereof to drive the alternator. Each drive shaft extends along and is rotatable about a corresponding axis. The drive shaft of the first generator set rotates in a first direction and the drive shaft of the second generator set rotates in a second, opposite direction.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings.

DETAILED DESCRIPTION OF THE INVENTION

Figure 1:
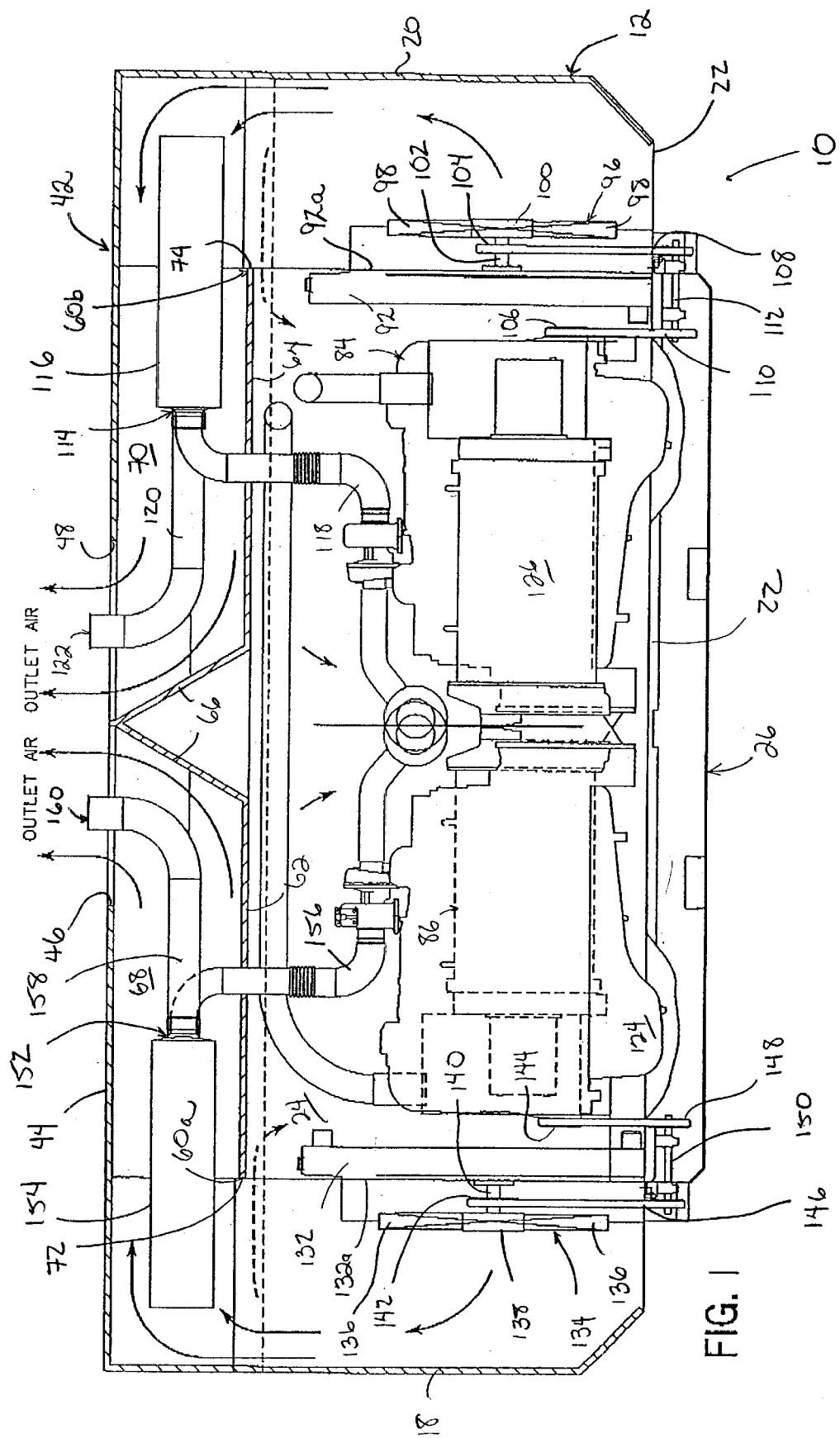
FIG. 1 is a side elevational view, with portions broken away, showing a generator structure in accordance with the present invention.
Figure 2:
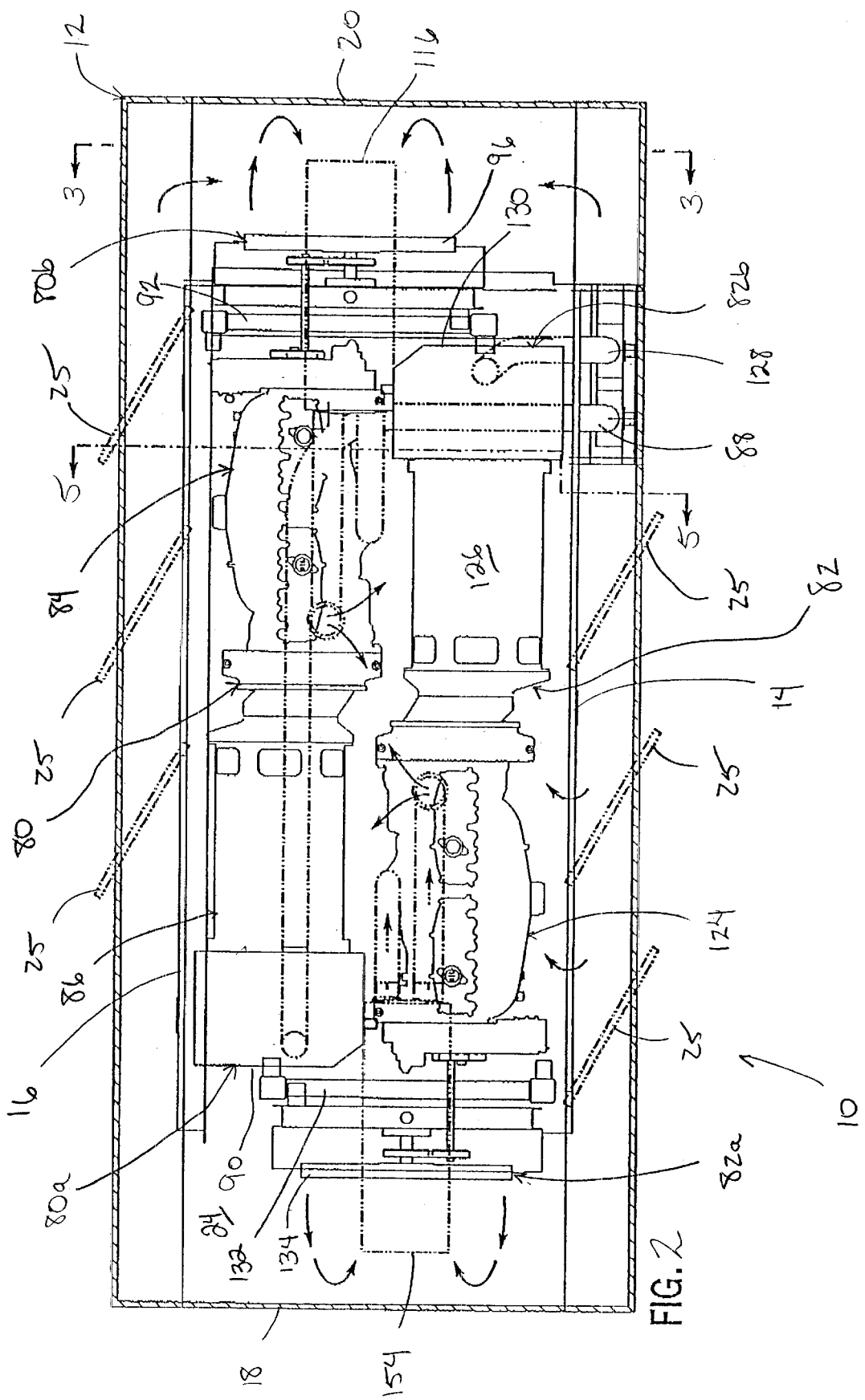
FIG. 2 is a top plan view, with portions broken away, showing the generator structure of FIG. 1.

Referring to FIGS. 1 and 2, a generator structure in accordance with the present invention is generally designated by the reference numeral 10. Generator structure 10 includes an enclosure 12 having first and second sidewalls 14 and 16, respectively, interconnected by first and second end walls 18 and 20, respectively, and a lower bottom support 22. Sidewalls 14 and 16 and end walls 18 and 20 define interior 24 of enclosure 12 therebetween. Sidewalls 14 and 16 may include one or more doors 25 therein for allowing a user access to interior 24 of enclosure 12.

Figure 3:
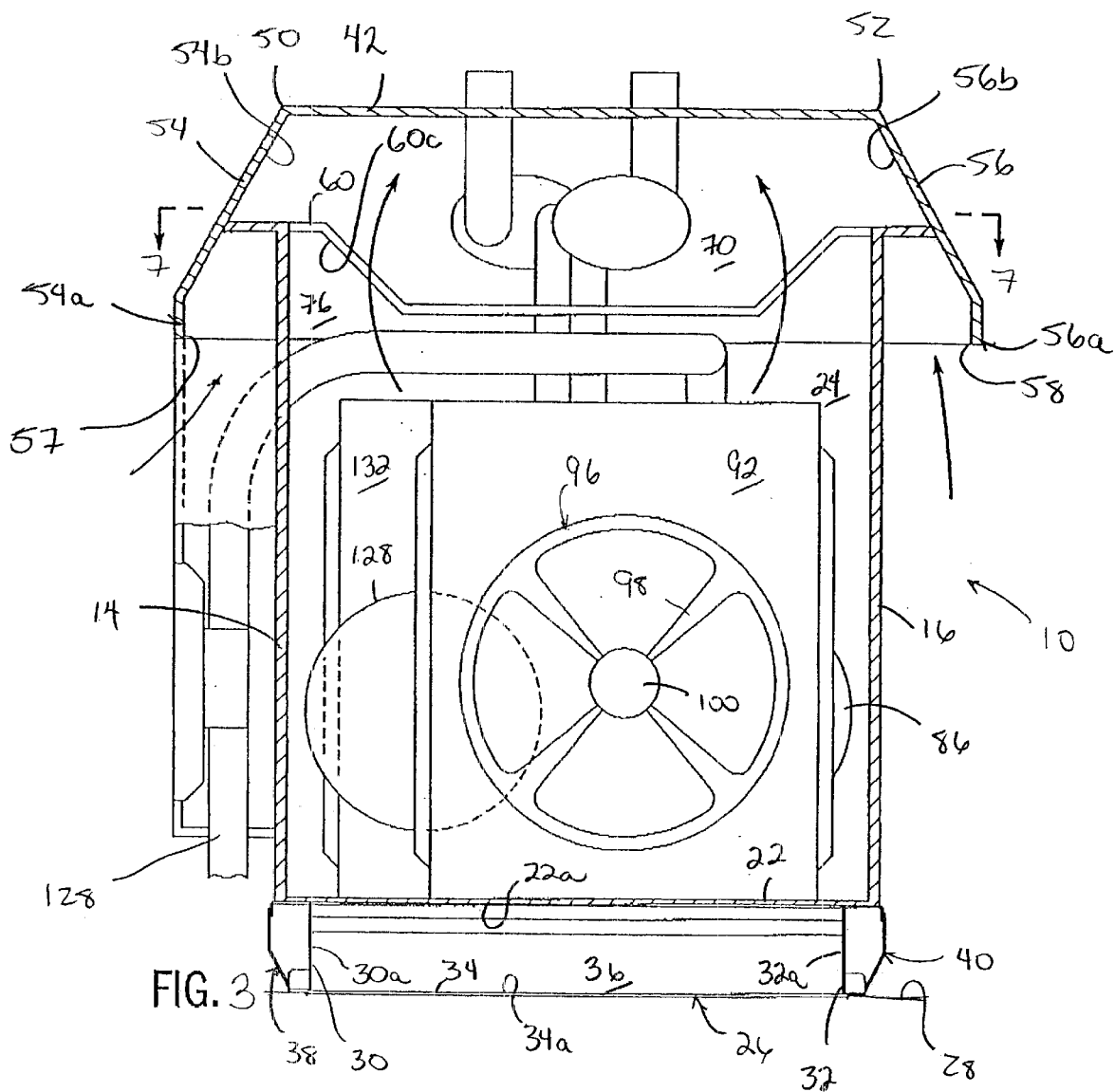
FIG. 3 is a cross-sectional view taken along line 3—3 of FIG. 2.

Referring to FIGS. 1 and 3, base 26 is mounted to the underside 22a of support 22 of enclosure 12 for supporting generator structure 10 above a supporting surface 28 such as the ground, a concrete slab or a mounting pad. Base 26 is generally rectangular in shape and defined by vertical sidewalls 30 and 32 interconnected by a bottom wall 34. Inner surfaces 30a and 32a of sidewalls 30 and 32, respectively, and inner surface 34a of bottom wall 34 define cavity 36 in base 26. It is contemplated to provide supports 38 and 40 adjacent outer surfaces 30b and 32b of sidewalls 30 and 32, respectively, to stabilize base 26.

Generator structure 10 further includes a roof structure, generally designated by the reference numeral 42. Roof structure 42 includes an upper panel 44 having first and second openings 46 and 48, respectively, extending therethrough. Upper panel 44 has first and second sides 50 and 52, respectively, which are generally parallel to sidewalls 14 and 16 of enclosure 12. First and second side panels 54 and 56, respectively, extend from corresponding sides 50 and 52, respectively, of upper panel 44 and diverge from each other. Side panel 54 terminates at a terminal edge 54a which is laterally spaced from sidewall 14 of enclosure 12 so as to define a first inlet 57 therebetween. Similarly, side panel 56 terminates at a terminal edge 56a which is spaced from sidewall 16 of enclosure 12 so as to define a second inlet 58 therebetween.

Separation panel 60 extends between inner surface 54b of first side panel 54 of roof structure 42 and inner surface 56b of second side panel 56 of roof structure 42. Separation panel 60 includes first and second portions 62 and 64, respectively, interconnected by a central portion 66. Central portion 66 intersects upper panel 44 such that first portion 62 of separation panel 60 and upper panel 44 define a first attic chamber 68 therebetween in roof structure 42 and second portion 64 of separation plate 60 and upper panel 44 define a second attic chamber 70 therebetween in roof structure 42. It can be appreciated that first attic chamber 68 in roof structure 42 may communicate with the ambient air outside of generator structure 10 through opening 46 in upper panel 44. In addition, second attic chamber 70 in roof structure 42 may communicate with the ambient air outside of generator structure 10 through second opening 48 in upper panel 44.

Figure 7:
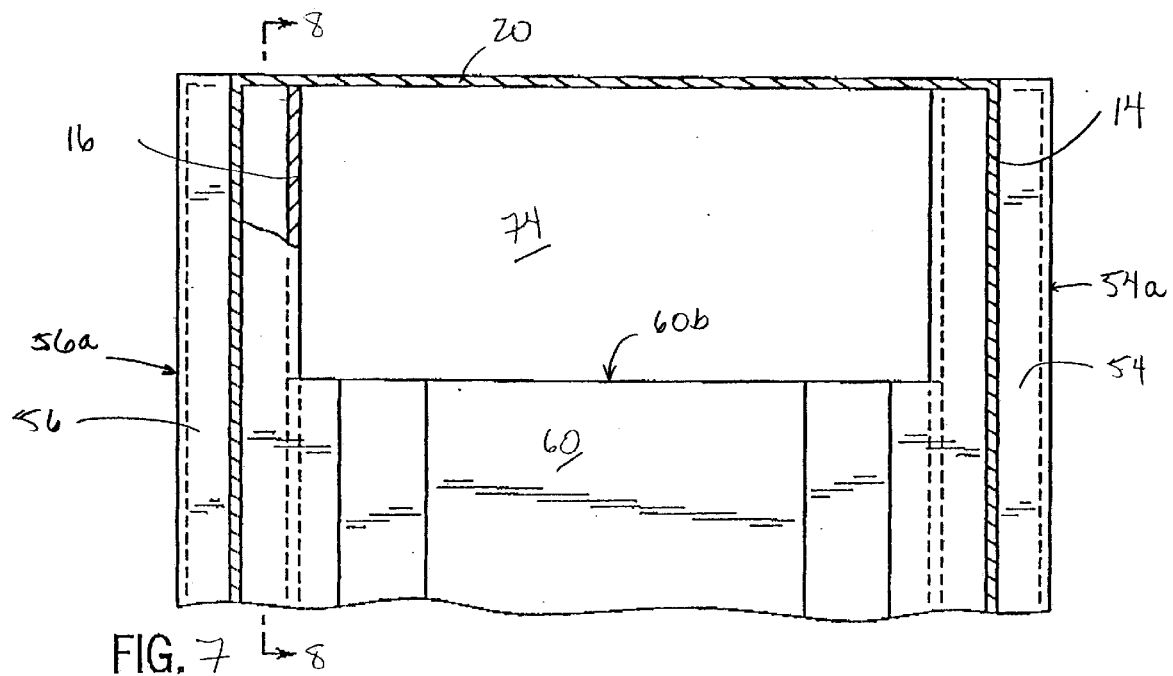
FIG. 7 is an enlarged, cross-sectional view taken along line 7—7 of FIG. 3.
Figure 8:
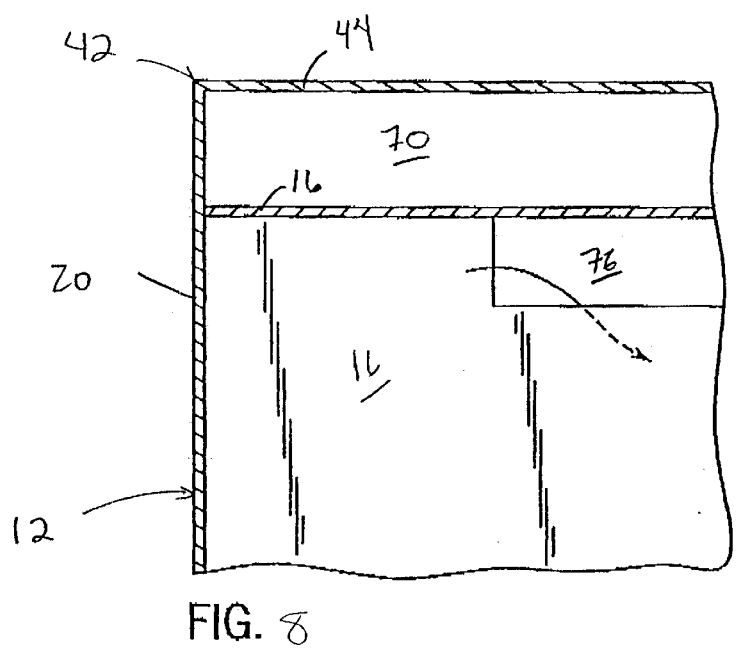
FIG. 8 is a cross-sectional view taken along line 8—8 of FIG. 7.

Separation panel 60 includes first end 60a spaced from end wall 18 of enclosure 12 so as to define first attic chamber inlet 72 between sidewalls 14 and 16. First attic chamber inlet 72 allows for first attic chamber portion 68 in roof structure 42 to communicate with interior 24 of enclosure 12 therethrough. Second end 60b of separation panel 60 is spaced from end wall 20 of enclosure 12 so as to define second attic chamber inlet 74 between sidewalls 14 and 16, FIGS. 7–8. Second attic air inlet 74 allows for second attic chamber 70 in roof structure 42 to communicate with interior 24 of enclosure 12 therethrough.

Lower surface 60c of separation panel 60 and the inner surfaces 54b and 56b of side panels 54 and 56, respectively, of roof structure 42 define an eave chamber 76 in roof structure 42. An outlet 78 to eave chamber 76 of roof structure 42 is provided between sidewalls 14 and 16 of enclosure 12. It can be appreciated that interior 24 of enclosure 12 may communicate with ambient air outside of generator structure 10 through eave chamber 76 in roof structure 42 and through first and second inlets 57 and 58, respectively.

As best seen in FIG. 2, generator structure 10 includes first and second generator sets 80 and 82, respectively, positioned next to one another within interior 24 of enclosure 12. Generator set 80 includes an alternator end 80a adjacent first end wall 18 of enclosure 12 and a fan end 80b adjacent second end wall 20 of enclosure 12. Generator set 82 includes a fan end 82a adjacent first end wall 18 of enclosure 12 and an alternator end 82b adjacent second end wall 20 of enclosure 12.

Figure 4:
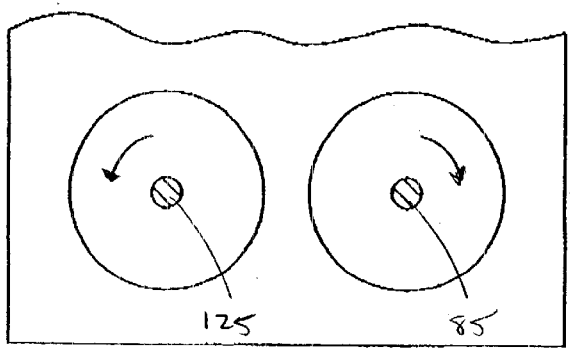
FIG. 4 is a schematic view showing rotation of the drive shafts of each generator set of the generator structure of the present invention.
Figure 5:
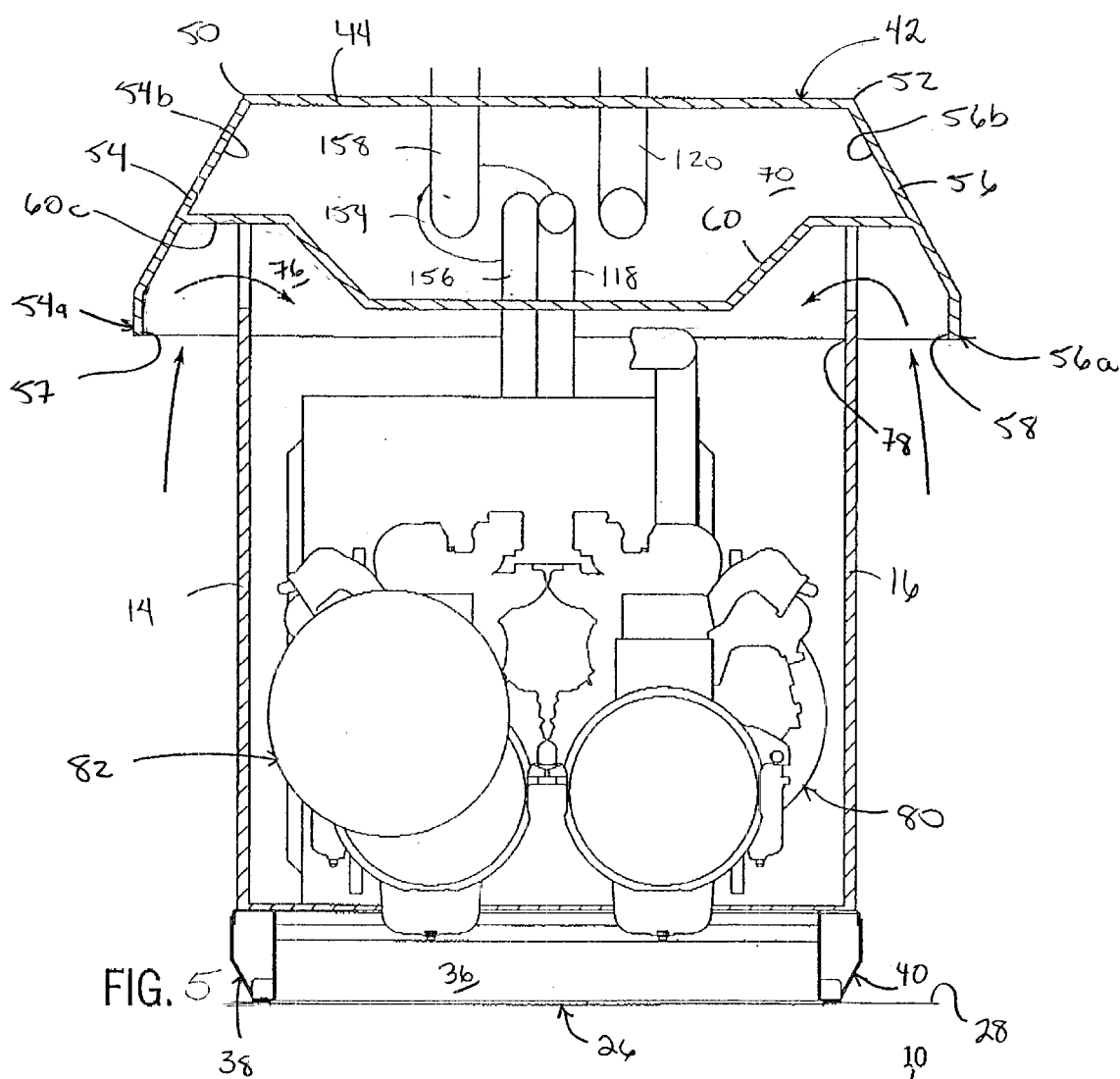
FIG. 5 is a cross-sectional view taken along line 5—5 of FIG. 2.

Generator set 80 includes an engine, generally designated by the reference numeral 84, which is supported on bottom support 22 of enclosure 12. As is conventional, engine 84 receives fuel such as diesel, natural gas or liquid propane vapor through an intake. The fuel is compressed and ignited within the cylinders of engine 84 so as to generate reciprocating motion of the pistons of engine 84. This reciprocating motion of the pistons of the engine 84 is converted to rotary motion such that engine 84 rotates a drive or crankshaft 85, FIG. 4. Crankshaft 85 of engine 84 is coupled to alternator 86 such that as crankshaft 85 is rotated by the operation of engine 84, crankshaft 85 drives alternator 86 which, in turn, converts the mechanical energy generated by engine 84 to electrical power for transmission and distribution. Conduit 88 has a first end operatively connected to alternator 86 within connection box 90 and a second, opposite end. Conduit 88 carries the electrical power generated by first generator set 80 to bus 89.

First generator set 80 further includes radiator 92 operatively connected to engine 84 such that engine coolant from engine 84 circulates through radiator 92 during operation of engine 84. As is conventional, radiator 92 includes a plurality of radiator tubes (not shown) through which the engine coolant flows. As hereinafter described, it is intended that air within interior 24 of enclosure 12 pass over the plurality of radiator tubes of radiator 92 so as to effectuate a heat exchange between the engine coolant flowing through the plurality of radiator tubes of radiator 92 and the air within enclosure 12.

In order to draw air over the plurality of radiator tubes of radiator 92, generator set 80 includes a fan, generally designated by the reference numeral 96. Fan 96 includes a plurality of fan blades 98 extending radially from central hub 100. Central hub 100 is rotatably supported on a first side 92a of radiator 92 by rotatable fan shaft 102. Fan shaft 102 includes a driven wheel 104 extending radially therefrom. Driven wheel 104 is operatively connected to drive wheel 106 through fan belts 108 and 110 and jack shaft 112. Drive wheel 106 is operatively connected to crankshaft 85 of engine 84 such that drive wheel 106 is rotated by a crankshaft 85 during operation of engine 84. Rotation of drive wheel 106 is translated to driven wheel 104 through belts 108 and 110 and jack shaft 112 which, in turn, rotates fan 96. Rotation of fan 96 draws air through first and second inlets 57 and 58, respectively, in roof structure 42; across engine 84 of first generator set 80; and across the plurality of radiator tubes of radiator 92 so as to cool engine 84 and the engine coolant flowing through the plurality of radiator tubes of radiator 92. In addition, fan 96 urges the air drawn across the plurality of radiator tubes of radiator 92 from the interior 24 of enclosure 12 into second attic chamber 70 in roof structure 42 through second attic chamber inlet 74; and out from roof structure 42 through second opening 48 in upper panel 44.

The exhaust outlet of engine 84 of first generator set 80 is interconnected to input 114 of muffler 116 through an exhaust pipe 118. Muffler 116 is positioned within second attic chamber 70 in roof structure 42 such that the air urged by fan 96 from generator structure 10 passes over muffler 116 to cool the same. Output of muffler 116 is operatively connected to the input of exhaust discharge tube 120. Exhaust discharge tube 120 includes outlet end 122 which extends through opening 48 in upper panel 44 of roof structure 42 and which communicates with the ambient air outside generator structure 10.

Second generator set 82 includes an engine, generally designated by the reference numeral 124, which is supported on bottom support 22 of enclosure 12. As is conventional, engine 124 receives fuel such as diesel, natural gas or liquid propane vapor through an intake. It is contemplated that engines 84 and 124 receive fuel from a common source. The fuel is compressed and ignited within the cylinders of engine 124 so as to generate reciprocating motion of the pistons of engine 124. This reciprocating motion of the pistons of engine 124 is converted to rotary motion such that engine 124 rotates a drive or crankshaft 125. Crankshaft 125 of engine 124 is coupled to an alternator 126 such that as crankshaft 125 is rotated by operation of engine 124, crankshaft 125 drives alternator 126 which, in turn, converts the mechanical energy generated by engine 124 to electrical power for transmission and distribution. Conduit 128 has a first end operatively connected to alternator 126 within connection box 130 and a second opposite end. Conduit 128 carries the electrical power generated by second generator set 82 to a bus 89, FIG. 6.

Second generator set further includes radiator 132 operatively connected to engine 124 such that coolant from engine 124 circulates through radiator 132 during operation of engine 124. As is conventional, radiator 132 includes aplurality ofradiator tubes (not shown) through which the engine coolant flows. As hereinafter described, it is intended that air within interior 24 of enclosure 12 pass over a plurality of radiator tubes of radiator 132 so as to effectuate a heat exchange between the engine coolant flowing through the plurality of radiator tubes of radiator 132 and the air within enclosure 12.

In order to draw air over the plurality of radiator tubes of radiator 132, generator set 82 includes a fan, generally designated by the reference numeral 134. Fan 134 includes a plurality of fan blades 136 extending radially from central hub 138. Central hub 138 is rotatably supported on a first side 132a of radiator 132 by rotatable fan shaft 140. Fan shaft 140 includes a driven wheel 142 extending radially therefrom. Driven wheel 142 is operatively connected to drive wheel 144 through fan belts 146 and 148 and jack shaft 150. Drive wheel 144 is operatively connected to crankshaft 125 of engine 124 such that drive wheel 144 is rotated by a crankshaft 125 during operation of engine 124. Rotation of drive wheel 144 is translated to driven wheel 142 through belts 146 and 148 and jack shaft 150 which, in turn, rotates fan 134. Rotation of fan 134 draws air through first and second inlets 57 and 58, respectively, in roof structure 42; across engine 124 of second generator set 82; and through radiator 132 across the plurality of radiator tubes thereof so as to cool engine 124 and the engine coolant flowing through the plurality of radiator tubes of radiator 132. In addition, fan 134 urges the air drawn across the plurality of radiator tubes of radiator 132 from the interior 24 of enclosure 12 into first attic chamber 68 in roof structure 42 through first attic chamber inlet 72; and out from roof structure 42 through first opening 46 in upper panel 44.

The exhaust outlet of engine 124 of second generator set 82 is interconnected to input 152 of muffler 154 through an exhaust pipe 156. Muffler 154 is positioned within first attic chamber 68 in roof structure 42 such that the air urged by fan 134 from generator structure 10 passes over muffler 154 to cool the same. Output of muffler 154 is operatively connected to the input of exhaust discharge tube 158. Exhaust discharge tube 158 includes outlet end 160 which extends through opening 46 in upper panel 44 of roof structure 42 and which communicates with the ambient air outside generator structure 10.

Figure 6:
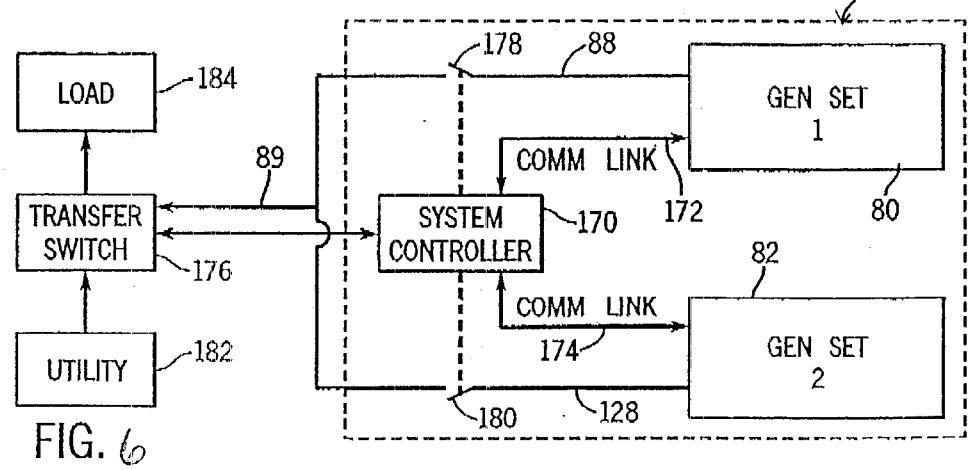
FIG. 6 is a schematic view showing connection of the generator structure of the present invention to a load.

Referring to FIG. 6, generator structure 10 includes system controller 170 that is operatively connected to first and second generator sets 80 and 82, respectively, through communication links 172 and 174, respectively. In addition, system controller 170 is operatively connected to transfer switch 176, for reasons hereinafter described, and to switches 178 and 180 in conduits 88 and 128, respectively.

Transfer switch 176 includes a first input operatively connected to utility source 182 and a second input electrically connected to generator structure 10 through bus 89. The output of transfer switch 176 is operatively connected to load 184. As is conventional, transfer switch 176 incorporates a switch which isolates the electrical power supplied by utility source 182 and the electrical power supplied by generator structure 10 on bus 89. A monitoring circuit is operatively connected to utility source 182 to monitor the electrical power supplied by utility source 182. In response to a power outage from utility source 182, the monitoring circuit of transfer switch 176 advises system controller 170 accordingly.

System controller 170 starts first and second generator sets 80 and 82, respectively, in a conventional manner and monitors the magnitude and phase of the electrical power generated thereby on conduits 88 and 128, respectively. Thereafter, system controller 170 adjusts the engine speed of engines 84 and 124 of first and second generator sets 80 and 82, respectively, via an electronic governor or the like such that the AC power generated by first and second generators 80 and 82, respectively, is brought into alignment (synchronized) with each other such that there is no phase difference between the sine waves and that the sine waves are at the same frequency. In addition, system controller 170 regulates the output voltages of generator sets 80 and 82 in a conventional manner such that output voltages of generators sets 80 and 82 are generally equal. System controller 170 closes switches 178 and 180 in conduits 188 and 128, respectively, such that the combined AC power generated by first and second generator sets 80 and 82, respectively, is provided on bus 89. Transfer switch 176 automatically transfers load from utility source 182 to generator structure 10 such that generator structure 10 provides AC power to load 184. Upon completion of the power outage, the transfer switch automatically reconnects load 184 to the utility source 182. In addition, the monitoring circuit of transfer switch 176 advises system controller 170 of generator structure 10 accordingly such that system controller 170 terminates operation of first and second generator sets 80 and 82, respectively.

As heretofore described, during operation of first and second generator sets 80 and 82, respectively, engines 84 and 124 drive corresponding fans 96 and 134, respectively. Rotation of fan 96 draws air through first and second inlets 57 and 58, respectively, in roof structure 42; across engine 84 of first generator set 80; and across the plurality of radiator tubes of radiator 92 so as to cool engine 84 and the coolant flowing through the plurality radiator of radiator 92. Further, rotation of fan 96 urges the air drawn across the plurality of radiator tubes of radiator 92 from the interior of enclosure 12 into second attic chamber 70 in roof structure 42 through second attic chamber inlet 74. The air in second attic chamber 70 passes over muffler 116 positioned therein so as to cool the same. Thereafter, the air exits roof structure 42 through second opening 48 in upper panel 44.

Similarly, rotation of fan 134 draws air through first and second inlets 57 and 58, respectively, in roof structure 42; across engine 124 of second generator set 82; and across the plurality of radiator tubes of radiator 132 so as to cool engine 124 and the engine coolant flowing through the plurality of radiator tubes of radiatorl 32. In addition, fan 134 urges the air drawn across the plurality of radiator tubes of radiator 132 from the interior 124 of enclosure 12 in first attic chamber 68 in roof structure 42 through first attic chamber inlet 72. The air in first attic chamber 68 passes over muffler 154 positioned therein so as to cool the same. Thereafter, the air exits roof structure 42 through first opening 46 in upper panel 44.

Various modes of carrying out the invention are contemplated as being within the scope of the following claims particularly pointing out and distinctly claiming the subject matter which is regarded as the invention.

We claim:

1. A generator structure, comprising:
   an enclosure having first and second spaced sidewalls interconnected by first and second end walls so as to define an interior of the enclosure;

a first generator set positioned within the enclosure, the first generator set including an engine and an alternator driven by the engine; and a second generator set positioned within the enclosure, the second generator set including an engine and an alternator driven by the engine of the second generator set;

wherein the first generator set is positioned adjacent the first sidewall of the enclosure and the second generator set is positioned adjacent the second sidewall of the enclosure.

2. The generator structure of claim 1 wherein each generator set includes a drive shaft operatively connecting the engine and the alternator to drive the alternator, each drive shaft extending along and rotatable about a corresponding axis.

3. The generator structure of claim 2 wherein the drive shaft of the first generator set rotates in a first direction and the drive shaft of the second generator set rotates in a second, opposite direction.

4. In a generator structure for generating electrical power, the generator structure including an enclosure having first and second spaced sidewalls interconnected by first and second end walls so as to define an interior of the enclosure, the improvement comprising;

a first generator set positioned within the enclosure, the first generator set including an engine and an alternator driven by the engine; and a second generator set positioned within the enclosure, the second generator set including an engine and an alternator driven by the engine of the second generator set;

wherein the first generator set is positioned adjacent the first sidewall of the enclosure and the second generator set is positioned adjacent the second sidewall of the enclosure.

5. The improvement of claim 4 wherein each generator set includes a drive shaft operatively connecting the engine and the alternator to drive the alternator, each drive shaft extending along and rotatable about a corresponding axis.

6. A generator structure, comprising:

an enclosure having first and second spaced sidewalls interconnected by first and second end walls so as to define an interior;

first and second generator sets positioned within the interior of the enclosure, each generator set including an engine, an alternator driven by the engine for generating electrical power and a radiator operatively connected to the engine;

means for synchronizing the electrical power generated by each alternator, a roof structure supported on the end walls of the enclosure, the roof structure including:

an upper panel having first and second openings therethrough and first and second sides generally parallel to the sidewalls of the enclosure;

first and second side panels extending from corresponding sides of the upper panel such that each side panel partially overlaps a corresponding sidewall of the enclosure, the first side panel and the first sidewall defining a first inlet therebetween and the second side panel and the second sidewall defining a second inlet therebetween; and a separation panel extending between the side panels such that the separation panel and the upper panel define an attic chamber therebetween; the separation panel and the first end wall define a first attic inlet to allow the interior of the enclosure to communicate with the attic chamber; and the separation panel and the second end wall define a second attic inlet for allowing for communication between the interior of the enclosure and the attic chamber;

a first air flow generator positioned within the interior of the enclosure for drawing ambient air through the first and second inlets in the roof structure, across the engine of the first generator set and through radiator of the first generator set and for urging air from the interior of the enclosure through the attic chamber in the roof structure and out of the generator structure through the first opening in the upper panel; and a second air flow generator positioned within the interior of the enclosure for drawing ambient air through the first and second inlets in the roof structure, across the engine of the second generator set and through radiator of the second generator set and for urging air from the interior of the enclosure through the attic chamber in the roof structure and out of the generator structure through the second opening in the upper panel.

7. The generator structure of claim 6 wherein each generator set includes a drive shaft extending from the engine to the alternator thereof to drive the alternator, each drive shaft extending along and rotatable about a corresponding axis.

8. A generator structure, comprising:

an enclosure having first and second spaced sidewalls interconnected by first and second end walls so as to define an interior of the enclosure;

a first generator set positioned within the enclosure, the first generator set including an engine and an alternator driven by the engine; and a second generator set positioned within the enclosure, the second generator set including an engine and an alternator driven by the engine of the second generator set;

wherein each generator set includes a fan end and an alternator end, the fan end of the first generator set being positioned adjacent the first end wall of the enclosure and the alternator end of the second generator set being positioned adjacent the first end wall of the enclosure.

9. The generator structure of claim 8 wherein the fan end of the second generator set is positioned adjacent the second end wall of the enclosure and the alternator end of the first generator set being positioned adjacent the second end wall of the enclosure.

10. A generator structure, comprising:

an enclosure having first and second spaced sidewalls interconnected by first and second end walls so as to define an interior of the enclosure;

a first generator set positioned within the enclosure, the first generator set including an engine and an alternator driven by the engine; and a second generator set positioned within the enclosure, the second generator set including an engine and an alternator driven by the engine of the second generator set;

wherein:

each generator set includes a drive shaft operatively connecting the engine and the alternator to drive the alternator, each drive shaft extending along and rotatable about a corresponding axis; and the drive shaft of the first generator set rotates in a first direction and the drive shaft of the second generator set rotates in a second, opposite direction.

11. A generator structure, comprising:

an enclosure having first and second spaced sidewalls interconnected by first and second end walls so as to define an interior of the enclosure;

a first generator set positioned within the enclosure, the first generator set including an engine and an alternator driven by the engine; and a second generator set positioned within the enclosure, the second generator set including an engine and an alternator driven by the engine of the second generator set;

wherein the first generator set generates electrical power at a first magnitude and frequency and the second generator set generates electrical power at a second magnitude and frequency.

12. The generator structure of claim 11 further comprising a means for synchronizing the electrical power generated by the first generator set and the electrical power generated by the second generator set.

13. In a generator structure for generating electrical power, the generator structure including an enclosure having first and second spaced sidewalls interconnected by first and second end walls so as to define an interior of the enclosure, the improvement comprising;

a first generator set positioned within the enclosure, the first generator set including an engine and an alternator driven by the engine; and a second generator set positioned within the enclosure, the second generator set including an engine and an alternator driven by the engine of the second generator set;

wherein each generator set includes a fan end and an alternator end, the fan end of the first generator set being positioned adjacent the first end wall of the enclosure and the alternator end of the second generator set being positioned adjacent the first end wall of the enclosure.

14. The improvement of claim 13 wherein the fan end of the second generator set is positioned adjacent the second end wall of the enclosure and the alternator end of the first generator set being positioned adjacent the second end wall of the enclosure.

15. In a generator structure for generating electrical power, the generator structure including an enclosure having first and second spaced sidewalls interconnected by first and second end walls so as to define an interior of the enclosure, the improvement comprising;

a first generator set positioned within the enclosure, the first generator set including an engine and an alternator driven by the engine; and a second generator set positioned within the enclosure, the second generator set including an engine and an alternator driven by the engine of the second generator set;

wherein:

each generator set includes a drive shaft operatively connecting the engine and the alternator to drive the alternator, each drive shaft extending along and rotatable about a corresponding axis; and the drive shaft of the first generator set rotates in a first direction and the drive shaft of the second generator set rotates in a second, opposite direction.

16. In a generator structure for generating electrical power, the generator structure including an enclosure having first and second spaced sidewalls interconnected by first and second end walls so as to define an interior of the enclosure, the improvement comprising;

a first generator set positioned within the enclosure, the first generator set including an engine and an alternator driven by the engine; and a second generator set positioned within the enclosure, the second generator set including an engine and an alternator driven by the engine of the second generator set;

wherein the first generator set generates electrical power at a first magnitude and frequency and the second generator set generates electrical power at a second magnitude and frequency and wherein the improvement includes a means for synchronizing the electrical power generated by the first generator set and the electrical power generated by the second generator set.

17. A generator structure, comprising:

an enclosure having first and second spaced sidewalls interconnected by first and second end walls so as to define an interior;

first and second generator sets positioned within the interior of the enclosure, each generator set including an engine, an alternator driven by the engine for generating electrical power and a radiator operatively connected to the engine; and means for synchronizing the electrical power generated by each alternator;

wherein the first generator set is positioned adjacent the first sidewall of the enclosure and the second generator is positioned adjacent the second sidewall of the enclosure.

18. A generator structure, comprising:

an enclosure having first and second spaced sidewalls interconnected by first and second end walls so as to define an interior;

first and second generator sets positioned within the interior of the enclosure, each generator set including an engine, an alternator driven by the engine for generating electrical power and a radiator operatively connected to the engine; and means for synchronizing the electrical power generated by each alternator;

wherein each generator set includes a fan end and an alternator end, the fan end of the first generator set being positioned adjacent the first end wall of the enclosure and the alternator end of the second generator set being positioned adjacent the first end wall of the enclosure.

19. The generator structure of claim 18 wherein the fan end of the second generator set is positioned adjacent the second end wall of the enclosure and the alternator end of the first generator set being positioned adjacent the second end wall of the enclosure.

20. A generator structure, comprising:

an enclosure having first and second spaced sidewalls interconnected by first and second end walls so as to define an interior;

first and second generator sets positioned within the interior of the enclosure, each generator set including an engine, an alternator driven by the engine for generating electrical power and a radiator operatively connected to the engine; and means for synchronizing the electrical power generated by each alternator;

wherein:

each generator set includes a drive shaft extending from the engine to the alternator thereof to drive the alternator, each drive shaft extending along and rotatable about a corresponding axis; and the drive shaft of the first generator set rotates in a first direction and the drive shaft of the second generator set rotates in a second, opposite direction.

* * * * *

UNITED STATES PATENT AND TRADEMARK OFFICE
CERTIFICATE OF CORRECTION

PATENT NO. : 6,552,454 B2
DATED : April 22, 2003
INVENTOR(S) : Robert D. Kern et al.

It is certified that error appears in the above-identified patent and that said Letters Patent is hereby corrected as shown below:

<u>Title page,</u>
Item [75], Inventors, delete "Rodney Nicosen" and substitute therefor
-- Rodney Nicoson --.

Signed and Sealed this

Twenty-third Day of September, 2003

JAMES E. ROGAN
*Director of the United States Patent and Trademark Office*